Oct. 24, 1961 V. E. DUDLEY 3,005,287
MULCH AND PLANT FEEDER
Filed Aug. 14, 1959
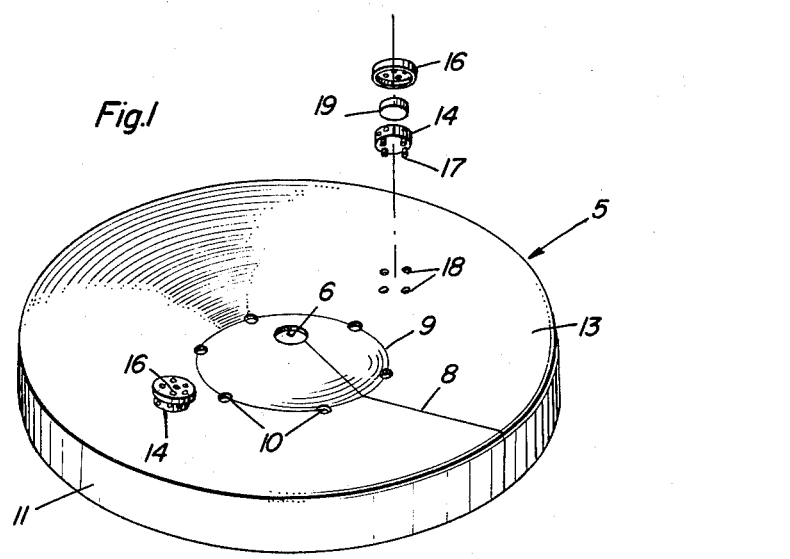
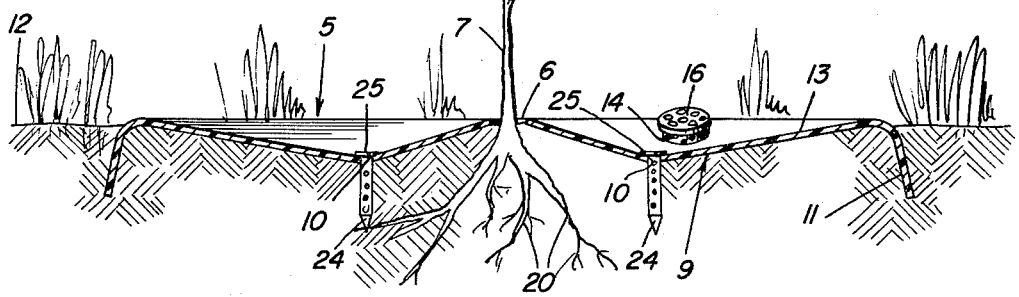
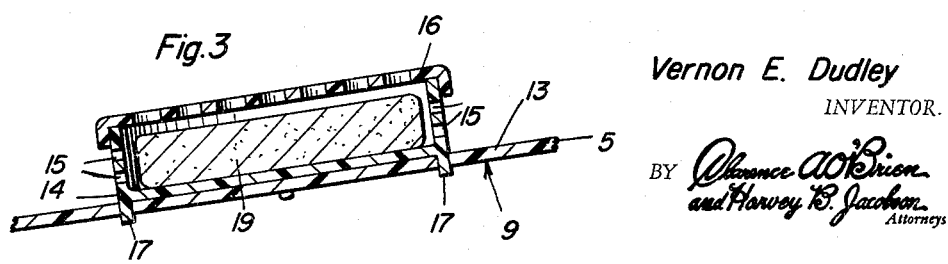
Vernon E. Dudley
INVENTOR.
BY *Clarence A. O'Brien*
*and Harvey B. Jacobson*
Attorneys

United States Patent Office 3,005,287
Patented Oct. 24, 1961

3,005,287
MULCH AND PLANT FEEDER
Vernon E. Dudley, Scott Depot, W. Va., assignor to Gala Industries, Inc., Clifton Forge, Va., a corporation of Virginia
Filed Aug. 14, 1959, Ser. No. 833,847
7 Claims. (Cl. 47—25)

This invention relates to new and useful improvements in mulches and has for its primary object to provide, in a manner as hereinafter set forth, novel means for preventing the growth of grass, weeds, etc., around plants, for funnelling water to the roots, thereof, and for preserving the moisture in the soil.

Another very important object of the present invention is to provide a mulch of the aforementioned character comprising unique means for feeding the plant.

Still another important object of the invention is to provide a mulch of the character described comprising a disk including novel means for securing said disk in position on the ground and for excluding grass and weed roots from beneath said disk.

Other objects of the invention are to provide a mulch mat or disk of the character set forth which will be of relatively simple construction, strong and durable, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, in which:

FIGURE 1 is a perspective view of a mulch constructed in accordance with the present invention, showing one of the feeding cups removed therefrom with the parts separated;

FIGURE 2 is a vertical sectional view, showing the device in use;

FIGURE 3 is a view in vertical section through one of the feeding cups; and

FIGURE 4 is a fragmentary view in vertical section, showing a modification.

Referring now to the drawing in detail, it will be seen that reference character 5 designates generally a disk of a suitable plastic or other material, which disk may be of any desired dimensions. The disk 5 has formed therein a centrally located circular opening 6 for the reception of the plant to be protected and fertilized, as indicated at 7. Extending from the opening 6 to the periphery of the disk 5 is a radial slit 8 to facilitate placing said disk around the plant.

The disk 5 is pre-shaped to provide a shallow annular trough 9 which encircles the plant 7. The lowermost or bottom portion of the trough has formed therein spaced drain holes 10. The disk 5 further includes a downturned peripheral portion or flange 11 which is embedded in the ground, as indicated at 12, for retaining the disk in position and for excluding the roots of adjacent grass, weeds, etc.

Mounted on the outer wall 13 of the trough 9 is any desired number of plant food cups 14. The cups 14 are perforated, as indicated at 15, and said cups are provided with removable, perforated covers 16. Depending from the cups 14 are lugs 17 which are engageable in openings 18 provided therefor in the disk 5 for removably securing said cups in position on said disk. In FIGURE 3 of the drawings, reference character 19 designates a cake of plant food in the cup 14.

It is thought that the use of the invention will be readily apparent from a consideration of the foregoing.

Briefly, the soil 12 around the plant 7 is prepared to receive the preshaped disk 5. The disk 5 is positioned on the soil around the plant 7 and the depending peripheral flange 11 is buried or embedded in said soil. Thus, the disk 5 is firmly anchored in position. Further, as hereinbefore indicated, the flange 11 functions as a guard for preventing the roots of adjacent weeds and grass from spreading beneath the disk 5. The flange 11 is flared whereby a stack of the disks 5 may be compactly nested for packing, shipping and storing. The disk 5, being substantially in the form of an annular trough encircling the plant, collects water from the adjacent area which, flowing through the perforated cups 14, picks up food from the soluble cakes 19 and passes through the holes 10 into the soil. The holes 10 also accommodate any desired number of pointed, perforated, flanged tubes 24 which are driven through said holes into the soil 12 for conducting the water and food to the roots 20 of the plant 7. The flanges 25 of the tubes 24 seat on the disk 5. The trough 9 will also function as a reservoir for holding the water until it can soak into the soil. Of course, the disk 5 prevents grass and weeds from growing near the plant 7 and robbing said plant of food and water. The cakes 19 in the perforated plastic cups 14 may be of any suitable water soluble plant food. In addition to preserving the moisture in the ground, the disk 5 facilitates mowing around the plant 7 and obviates the necessity of trimming. The disk 5, which may also be of plastic-coated cardboard, may carry installation instructions, advertising and other matter.

In the modification of FIGURE 4 of the drawing, reference character 21 designates a porous bag of plant food on the disk 5. The food package 21 is secured in position in the trough 9 through the medium of a string 22 connected to a nail or spike 23 which is driven into the ground through the disk 5.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A mulch comprising: a sheet material disk forming an annular trough with an open top for encircling a plant, said trough being adapted for the reception of water and having drain holes therein, a foraminous container for a water soluble plant food mounted on the upper surface of said disk in the trough, a flange extending downwardly from the periphery of the disk to below the level of said trough and adapted to be embedded in the ground to anchor the disk in position, and keeper lugs provided at the underside of said container and removably received in openings provided in said disk whereby to removably retain said container in position.

2. A mulch comprising: a sheet material disk forming an annular trough with an open top for encircling a plant, said trough being adapted for the reception of water and having drain holes therein, a foraminous container for a water soluble plant food mounted on the upper surface of said disk in the trough, and perforated tubes extending through said holes into the ground for conducting water from the trough to the roots of the plant and for anchoring the disk in position on the ground.

3. The device as defined in claim 2 together with keeper lugs provided at the underside of said container and removably received in openings provided in said disk whereby to removably retain said container in position.

4. A mulch comprising: a disk formed from material impermeable to water and adapted to be positioned on the surface of the ground, said disk having a raised center portion, a raised outer marginal edge portion and a depressed intermediate portion providing an annular trough between said center portion and said marginal edge portion, said trough being adapted to receive and contain water and having a plurality of drain holes formed therein, said center portion of said disk being provided with a plant receiving opening whereby the disk may encircle a plant when positioned on the ground, and a foraminous container for water soluble plant food mounted on the upper surface of said disk in said trough.

5. The device as defined in claim 4 together with keeper lugs provided at the underside of said container and removably received in openings provided in said disk whereby to removably retain said container in position.

6. The device as defined in claim 4 together with a spike extending through said disk into the ground to anchor the disk in position, and an elongated flexible element provided on said container and connected to said spike to retain the container on the disk.

7. A mulch comprising: a disk forming an annular trough with an open top for encircling a plant, said trough being adapted for the reception of water and having drain holes therein, a foraminous container for a water soluble plant food mounted on the upper surface of said disk in the trough, and keeper lugs provided at the underside of said container and removably received in openings provided in said disk whereby to removably retain said container in position.

References Cited in the file of this patent

UNITED STATES PATENTS

| | | |
|---|---|---|
| 1,554,865 | Magoon | Sept. 22, 1925 |
| 2,822,644 | Berger | Feb. 11, 1958 |

FOREIGN PATENTS

| | | |
|---|---|---|
| 376,167 | France | June 1, 1907 |
| 834,309 | France | Aug. 16, 1938 |
| 514,178 | Germany | Dec. 9, 1930 |
| 116,947 | Great Britain | July 4, 1918 |
| 26,775 | France | Nov. 16, 1923 |
| | (Addition to No. 554,932) | |